June 30, 1964 J. MANN 3,139,252
FISHING ROD HOLDER
Filed Jan. 23, 1963
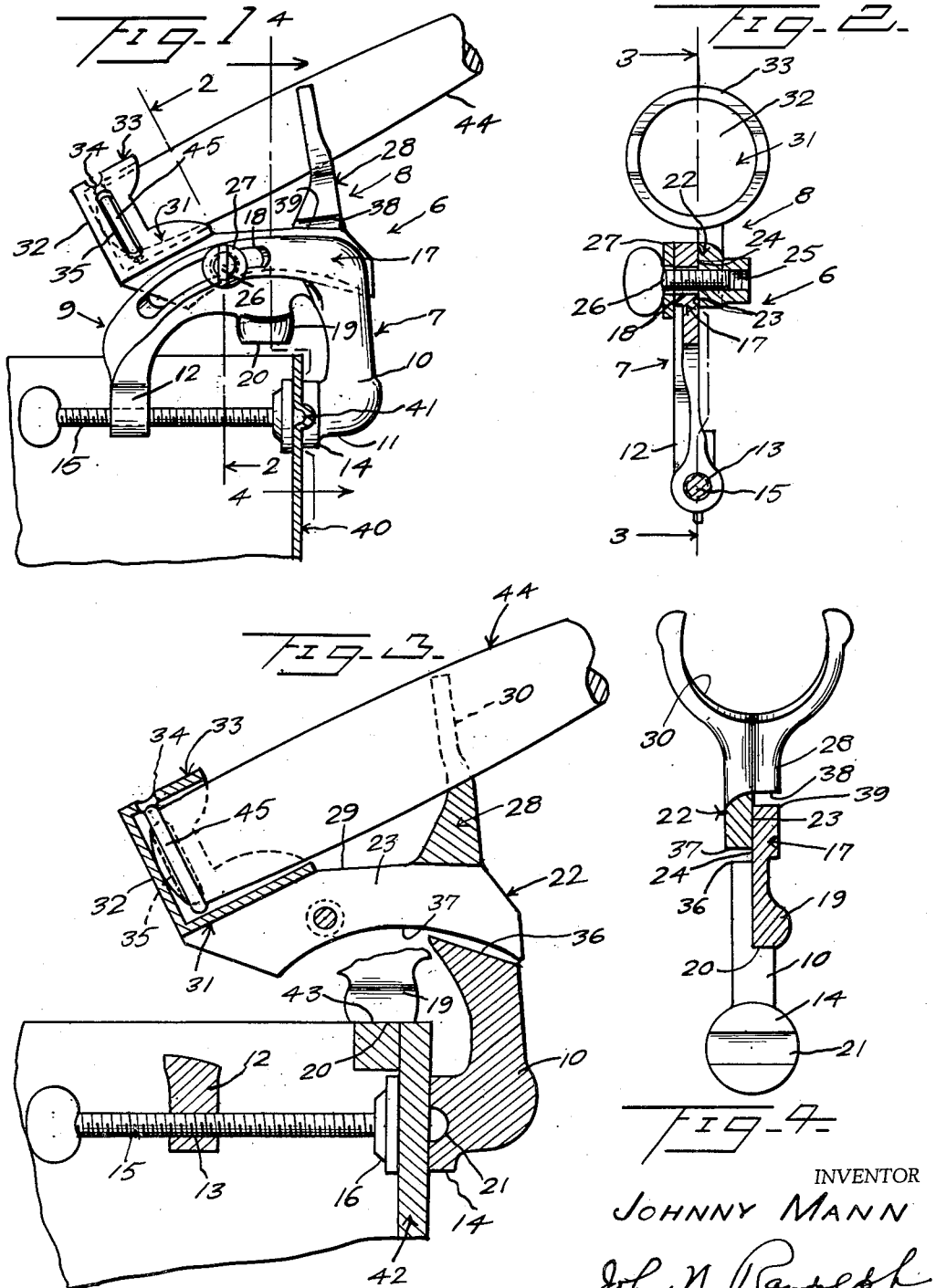
INVENTOR
JOHNNY MANN
BY John N. Randolph
ATTORNEY United States Patent Office 3,139,252
Patented June 30, 1964

3,139,252
FISHING ROD HOLDER
Johnny Mann, Rte. 2, 3171 Falls Ave., Wabash, Ind.
Filed Jan. 23, 1963, Ser. No. 253,488
1 Claim. (Cl. 248—40)

This invention relates to a novel holder for fishing rods or fishing poles and which may be utilized for supporting a rod or pole while the fisherman is removing a fish or baiting a hook, and which may also be utilized for holding the rod or pole while fishing.

More particularly, it is an object of the present invention to provide a fishing rod holder having a uniquely constructed part capable of functioning effectively with a part of a convential fishing rod for effectively holding the rod securely attached to the holder, but which will enable the rod to be readily removed from the holder by swingably moving the rod in a particular direction.

Still a further object of the invention is to provide a fishing rod holder which may be readily clamped rigidly to the gunnel of a rowboat or similar small boat and so that the holder will not be overturned due to the weight of a rod supported thereby.

Still another object of the invention is to provide a fishing rod holder which is extremely compact enabling it to be stored in a fishing tackle box or carried in a garment pocket.

Various other objects and advantages of the invention will hereinafter become more fully apparent from the following description of the drawing, illustrating a presently preferred embodiment thereof, and wherein:

FIGURE 1 is a side elevational view showing the fishing rod holder in use;

FIGURE 2 is an enlarged transverse sectional view taken substantially along the line 2—2 of FIGURE 1;

FIGURE 3 is a fragmentary longitudinal sectional view taken substantially along the line 3—3 of FIGURE 2, and FIGURE 4 is an enlarged transverse sectional view taken substantially along the line 4—4 of FIGURE 1.

Referring more specifically to the drawing, the fishing rod holder in its entirety is designated generally 6 and includes a clamp section, designated generally 7 and a rod supporting section, designated generally 8.

The clamp section 7 includes an arch shaped frame 9 having a depending front leg 10 which is provided at its lower end with an inwardly facing stationary clamp jaw 11. The frame 9 has a depending rear leg 12 which is provided with a threaded bore 13 which is spaced from the jaw 11 and disposed with its axis normal to the plane of the face 14 of said jaw 11. A long thumbscrew 15 is threaded inwardly through the bore 13 and has a washer or head 16 mounted on its inner end and which is swivelly connected to the screw 15, in a conventional manner.

The frame 9 includes an elongated top portion 17 which is inclined downwardly from the front leg 10 toward the rear leg 12, which is longitudinally bowed upwardly, and which has an elongated opening or slot 18 opening transversely therethrough and extending longitudinally thereof. The slot 18 is longitudinally bowed to substantially correspond to the curvature of the upper frame portion 17. The upper frame portion 17, near to but spaced from the front leg 10, has a depending abutment member 19 which is provided with a flat bottom surface 20 which is disposed above and substantially parallel to the clamping screw 15. The stationary jaw face 14 has a groove 21 which extends transversely thereacross.

The rod supporting section 8 includes an elongated bar 22 which is longitudinally curved to substantially correspond to the curvature of the upper frame portion 17, and which has a flat side 23 which abuts against a flat side 24 of the frame portion 17. The bar 22 has a transversely extending threaded bore 25 to threadedly receive a thumbscrew 26 which extends loosely through the slot 18 and which carries a washer 27 which bears against the other side of the frame portion 17, above and below the slot 18, as seen in FIGURES 1 and 2.

A post 28 is formed integral with the bar 22 and extends upwardly from one end of a top edge 29 thereof. The post 28 terminates in an upwardly opening fork 30 which is disposed crosswise of the bar 22.

A socket member 31 is formed integral with and is disposed above the other end of the top edge 29. The socket member 31 opens toward the fork 30 and is disposed at an incline so as to face substantially directly toward the fork. The socket 31 has a rear wall 32 and a cylindrical side wall 33. The cylindrical wall 33 has a circumferentially extending slot 34 in its top portion and circumferentially extending opposed slots 35 in side portions thereof. The slots 34 and 35 are disposed in substantially the same plane and spaced from but in relatively close proximity to the rear wall 32.

A portion of the front leg 10 protrudes beyond the plane of the flat side 24 and has an upper end portion defining an upwardly facing abutment surface 36 which underlies a portion of the bottom edge 37 of the bar 22. The post 28 includes a portion which is disposed directly over a part of the top frame portion 17 and which has a downwardly facing abutment surface 38 which overlies a part of the upper edge 39 of the frame portion 17. The surfaces 36, 37 and 38, 39 limit the extent that the forward end of the rod supporting section 8 can rock downwardly relative to the clamp section 7 when fastening 26 is loosened. As seen in FIGURE 2, a part of the socket 31 overlies another portion of the upper edge 39 to limit the extent that the rear end of the rod supporting section 8 can rock downwardly relative to the clamp section 7 when the thumbscrew 26 is loosened.

FIGURE 1 illustrates the holder 6 mounted on the gunnel of a metal boat 40 and which boat normally has a pressed out strengthening bead 41 extending along the sides thereof. The stationary jaw 11 is disposed externally of the boat 40 and a part of the bead 41 is received in the groove 21 of the jaw face 14. When the screw 15 is tightened to clamp the washer or head 16 against the inner side of the gunnel, the clamp section 7 is secured immovably to the boat 40.

FIGURE 3 shows the clamp section 7 applied to the gunnel of a wooden boat 42 with the jaw face 14 bearing against the exterior of a side of the boat and the clamping washer 16 abutting the interior of said side. The bottom surface 20 of the abutment 19 rests flush upon a part of the top surface 43 of the gunnel to prevent any rocking movement of the holder 6 relative to the boat 42 when the screw 15 is tightened.

With either application of the holder 6, as seen in FIGURES 1 and 3, the rod supporting section 8 is disposed in the same manner above the clamp section 7 and at an incline. The angle of the rod supporting section 8 can be varied by loosening the thumbscrew 26 and sliding the section 8 to the left of its position of FIGURE 1 to increase the inclination thereof or in the opposite direction for decreasing said inclination. It will be understood that the thumbscrew 26 is always tightened after the desired adjustment and inclination of the supporting section 8 relative to the clamp section 7 has been determined and accomplished.

The butt or handle portion 44 of a conventional fishing rod or pole is shown applied to the holder 6. The distal end of the butt or handle 44 has an annular enlargement or knob 45, as is conventional. When the distal end of the butt or handle 44 is bearing against the inner side of the socket end wall 32, the bead or enlargement 45 is disposed coplanar with the slots 34 and 35. Another part of the butt or handle 44, which is spaced from the enlargement 45, seats in the fork 30. It will be obvious that the weight of the fishing rod or pole will have its preponderance to the right of the fork 30, as seen in FIGURES 1 and 3, so that said rod or pole will tend to rock clockwise about the fork 30. This will cause the knob or bead 45 to be wedged in the slots 34 and 35, and as said knob or bead is generally formed of a resilient material such as rubber, the fishing rod will thus be effectively anchored to the holder 6, while supported therein for removing a fish or baiting a hook or while fishing. The butt will be even more tightly clamped to the socket 31 should a strike occur while fishing and while the fishing rod or pole is supported as seen in FIGURES 1 and 3. However, by merely lifting upwardly on the handle or butt 44, the knob or enlargement 45 will be displaced downwardly against the bottom portion of the socket 31 and out of engagement with the slots 34 and 35, so that the butt or handle can be readily disengaged from the socket 31.

Various modifications and changes are contemplated and may be resorted to, without departing from the function or scope of the invention as hereinafter defined by the appended claim.

I claim as my invention:

A fishing rod holder including a rod support having an upwardly opening fork and a socket member, said socket member being disposed behind, in alignment with and spaced from said fork and being adapted to receive the butt end of a fishing rod handle another part of which is adapted to rest and fulcrum in said fork, and said socket member having circumferentially extending slots in the top and side portions thereof in which parts of a knob of said butt end of the fishing rod handle are adapted to be wedged due to the tendency of said butt end to rock upwardly relative to the socket when the fishing rod is supported by the holder.

References Cited in the file of this patent

UNITED STATES PATENTS

| | | |
|---|---|---|
| 2,690,317 | Hoffman | Sept. 28, 1954 |
| 2,900,152 | Hahn | Aug. 18, 1959 |

FOREIGN PATENTS

| | | |
|---|---|---|
| 596,336 | France | Aug. 8, 1925 |